May 12, 1931.   F. M. BARTON   1,804,452
METALLIC STRUCTURAL MEMBER
Filed Jan. 7, 1928
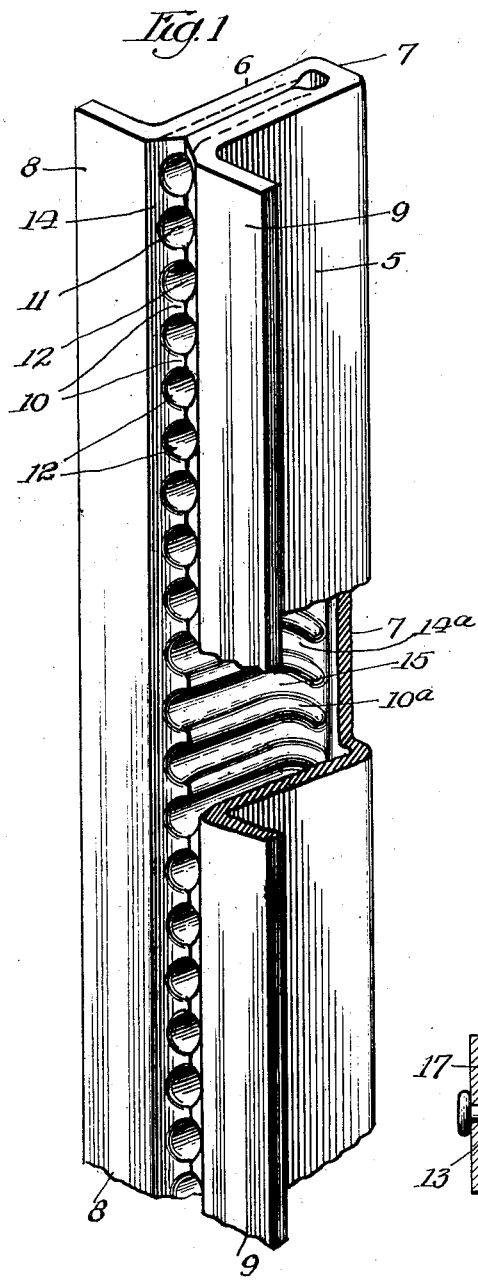
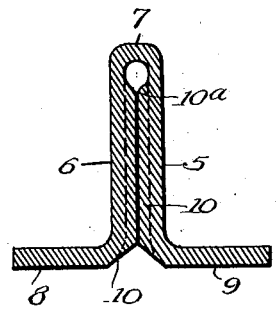
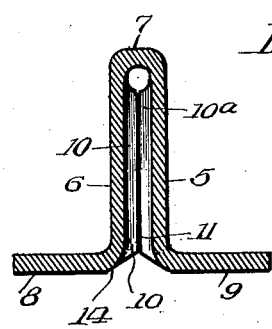
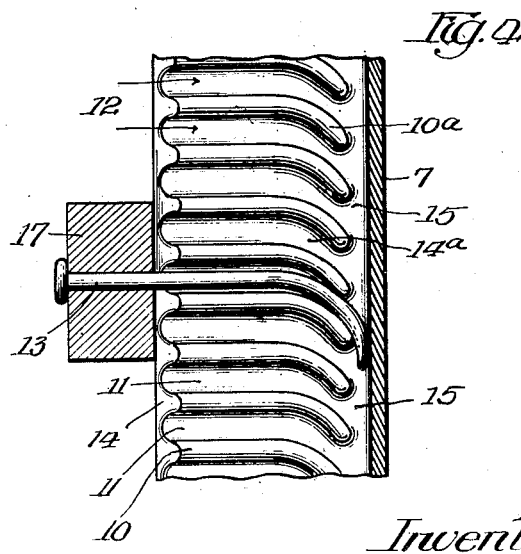
Inventor
Francis M. Barton
By Fred Gerlach
his Atty.

Patented May 12, 1931

1,804,452

UNITED STATES PATENT OFFICE

FRANCIS M. BARTON, OF CHICAGO, ILLINOIS, ASSIGNOR, BY MESNE ASSIGNMENTS, TO SCOTT-WEISS STEEL COMPANY, OF CHICAGO, ILLINOIS, A CORPORATION OF ILLINOIS

METALLIC STRUCTURAL MEMBER

Application filed January 7, 1928. Serial No. 245,083.

The invention relates to structural members formed of metal.

In the use of structural steel members, such as posts, studding, joists and purlins, it is frequently desired to attach parts to be associated therewith; for example, in the use of posts, it is desired to attach fence wires or anchors; in the use of joists, it is desirable to nail stringers or planking thereto; and in the use of studding, it is desirable to nail strips thereto.

One object of the invention is to provide a structural member formed of metal which is adapted to receive and retain attaching devices, such as nails, so that parts may be secured thereto.

Another object of the invention is to provide a structural member of metal which is adapted for the attachment of other parts thereto, and which can be produced at a low cost.

Other objects of the invention will appear from the description.

The invention consists in the several novel features hereinafter set forth and more particularly defined by claims at the conclusion hereof.

In the drawings: Fig. 1 is a perspective of a structural member embodying the invention, a portion thereof being broken away for illustrative purposes. Figs. 2 and 3 are transverse sections. Fig. 4 is a longitudinal section.

The invention is exemplified in a structural steel member of any desired length and which comprises substantially parallel side walls 5 and 6 which are joined at their inner ends by a connecting wall 7 and flanges 8 and 9 extending parallel from the outer ends of the side walls respectively. The inner faces of walls 5 and 6 are formed with alternating flues or ribs 10 and grooves 11, the ribs and grooves on the walls being complementary to form a continuous series of sockets 12 which are adapted to receive attaching devices, such as nails 13. The corner portions between the side walls and the flanges are bevelled, as at 14, to form guide surfaces for directing nails into the sockets. The outer portions of the flues or ribs 10 extend approximately transverse to the length of the member and their inner ends are oblique, as at 14ª, to bend or deflect the portion of the nail adjacent its point to form an interlock between the member and the nail. The oblique portions of the ribs or flues 10 terminate outwardly of the connecting wall 7 to form a groove or space 15 into which the point of the nail 13 or points of a staple will be deflected by the oblique portions 10ª and the connecting wall 7.

The member is manufactured from a bar of metal by the hot rolled process. Flues are shaped on the bar before it is rolled to bring the walls 5 and 6 into parallel relation. The flanges 8 and 9 serve to reinforce the member transversely.

In practice, the member may be used as a structural unit of metal and particularly in places where it is desired to attach thereto parts to be supported by attaching devices, such as nails or staples. When the nails or staples are driven through a part to be secured thereto, such as a strip of wood 17, their points will first enter the straight portions of the socket 11, and, as they encounter the oblique portions 10ª, will be deflected to clinch or positively secure the nail in the metallic structural member. When desired, nails or staples of sufficient length may be used to cause their points to be deflected longitudinally into the groove 15, so that they will be securely held against withdrawal from the structural member.

The invention exemplifies a structural member formed of metal which is provided with a series of sockets formed by integral portions of the member, and which are adapted to securely retain nails or attaching devices driven into them to secure parts to the member. The invention may be applied to fence posts, to which it is desired to secure fence wires and anchoring plates, joists, studding or purlin, to which other elements are to be secured, as well understood in the art.

The invention is not to be understood as restricted to the details set forth, since these may be modified within the scope of the appended claims without departing from the spirit and scope of the invention.

Having thus described the invention, what I claim as new and desire to secure by Letters Patent, is:

1. A structural member formed of metal and comprising a pair of oppositely facing side walls having integral ribs operative to form a row of sockets for receiving attaching devices, the parts of the ribs adjacent to the ends of the sockets entered by the attaching devices being bevelled to form guide surfaces for directing said devices into the sockets.

2. A structural member formed of metal and comprises a pair of oppositely facing side walls, and ribs formed integrally with and projecting inwardly from the inner faces of the side walls, said ribs being operative to form sockets for receiving attaching devices and having the ends thereof relatively angled to deflect or bend the ends of the attaching devices.

3. A structural member formed of metal and comprising a pair of oppositely facing side walls joined together by an integral cross-wall, and ribs formed integrally with and projecting inwardly from the inner faces of the side walls, operative to form sockets for receiving attaching devices, the inner ends of said ribs being spaced from the cross wall to form a transverse groove into which the ends of the attaching devices are adapted to be extended.

4. A structural member formed of metal and comprising a pair of oppositely facing side walls joined together by an integral cross-wall, and ribs formed integrally with and projecting inwardly from the inner faces of the side walls, said ribs forming sockets for receiving attaching devices and having the inner ends thereof spaced from the cross wall to form a transverse groove, said inner ends of the ribs being relatively angled and operative to bend the ends of the attaching devices and deflect them into the groove.

Signed at Chicago, Illinois, this 6th day of September, 1927.

FRANCIS M. BARTON.